United States Patent
Rodwell

(10) Patent No.: US 11,969,959 B2
(45) Date of Patent: Apr. 30, 2024

(54) METHODS FOR MANUFACTURING BLADE COMPONENTS FOR WIND TURBINE ROTOR BLADES

(71) Applicant: General Electric Company, Schenectady, NY (US)

(72) Inventor: Andrew Mitchell Rodwell, Greenville, SC (US)

(73) Assignee: GE Infrastructure Technology LLC, Greenville, SC (US)

( * ) Notice: Subject to any disclaimer, the term of this patent is extended or adjusted under 35 U.S.C. 154(b) by 385 days.

(21) Appl. No.: 17/312,766

(22) PCT Filed: Dec. 11, 2018

(86) PCT No.: PCT/US2018/064834
§ 371 (c)(1),
(2) Date: Jun. 10, 2021

(87) PCT Pub. No.: WO2020/122864
PCT Pub. Date: Jun. 18, 2020

(65) Prior Publication Data
US 2022/0055319 A1    Feb. 24, 2022

(51) Int. Cl.
*B29C 70/42*    (2006.01)
*B29C 59/14*    (2006.01)
(Continued)

(52) U.S. Cl.
CPC .............. *B29C 70/42* (2013.01); *B29C 59/14* (2013.01); *F03D 1/0675* (2013.01);
(Continued)

(58) Field of Classification Search
CPC .... B29C 70/42; F03D 1/0675; F05B 2230/50; F05B 2280/6015; F05B 2280/6003; B29L 2031/085; Y02E 10/72; B29D 99/0028
See application file for complete search history.

(56) References Cited

U.S. PATENT DOCUMENTS 851,196 A    4/1907  Bevans et al.
4,474,536 A    10/1984  Gougeon et al.
(Continued)

FOREIGN PATENT DOCUMENTS

CA    2957157 A1    3/2016
CN    104985828 A    10/2015
(Continued)

OTHER PUBLICATIONS

International Search Report & Written Opinion for PCT/US2018/064834 dated Sep. 12, 2019.
(Continued)

*Primary Examiner* — Francisco W Tschen
*Assistant Examiner* — Elisa H Vera
(74) *Attorney, Agent, or Firm* — Dority & Manning, P.A.

(57) ABSTRACT

A method of manufacturing a blade component of rotor blade of a wind turbine includes providing a plurality of pultrusions constructed of one or more fibers or fiber bundles cured together via a resin material. The method also includes placing a protective cap over at least one end of one or more of the plurality of pultrusions. Further, the method includes heat treating a surface of the plurality of pultrusions while the protective cap remains over the at least one end. Moreover, the method includes removing the protective cap from the at least one end. The method further includes arranging the plurality of pultrusions in a mold of the blade component. In addition, the method includes infusing the plurality of pultrusions together so as to form the rotor blade component.

20 Claims, 5 Drawing Sheets

(51) Int. Cl.
    *B29L 31/08*        (2006.01)
    *F03D 1/06*         (2006.01)
(52) U.S. Cl.
    CPC ..... *B29L 2031/085* (2013.01); *F05B 2230/50* (2013.01); *F05B 2280/6003* (2013.01); *F05B 2280/6015* (2013.01)

(56) References Cited

U.S. PATENT DOCUMENTS

| | | |
|---|---|---|
| 4,643,646 A | 2/1987 | Hahn et al. |
| 4,680,923 A | 6/1987 | Kaempen |
| 4,732,542 A | 3/1988 | Hahn et al. |
| 5,132,070 A | 7/1992 | Paul et al. |
| 5,281,454 A | 1/1994 | Hanson |
| 7,334,989 B2 | 2/2008 | Arelt |
| 7,344,360 B2 | 3/2008 | Wetzel |
| 7,901,188 B2 | 3/2011 | Llorente Gonzalez et al. |
| 7,922,454 B1 | 4/2011 | Riddell |
| 7,927,077 B2 | 4/2011 | Olson |
| 7,997,874 B2 | 8/2011 | van der Bos |
| 7,998,303 B2 | 8/2011 | Baehmann et al. |
| 8,123,488 B2 | 2/2012 | Finnigan et al. |
| 8,297,932 B2 | 10/2012 | Arocena De La Rua et al. |
| 8,348,622 B2 | 1/2013 | Bech |
| 8,356,982 B2 | 1/2013 | Petri Larrea et al. |
| 8,376,713 B2 | 2/2013 | Kawasetsu et al. |
| 8,388,316 B2 | 3/2013 | Arocena De La Rua et al. |
| 8,506,873 B2 | 8/2013 | Graeber et al. |
| 8,517,689 B2 | 8/2013 | Kyriakides et al. |
| 8,919,754 B2 | 12/2014 | Schibsbye |
| 9,669,589 B2 | 6/2017 | Zamora Rodriguez et al. |
| 2003/0157751 A1 | 8/2003 | Ehrfeld et al. |
| 2007/0018049 A1 | 1/2007 | Stuhr |
| 2007/0253824 A1 | 11/2007 | Eyb |
| 2009/0116962 A1 | 5/2009 | Pedersen et al. |
| 2009/0155084 A1 | 6/2009 | Livingston et al. |
| 2009/0162208 A1 | 6/2009 | Zirin et al. |
| 2010/0132884 A1 | 6/2010 | Baehmann et al. |
| 2010/0215494 A1 | 8/2010 | Bech et al. |
| 2010/0304170 A1 | 12/2010 | Frederiksen |
| 2011/0052403 A1 | 3/2011 | Kawasetsu et al. |
| 2011/0081247 A1 | 4/2011 | Hibbard |
| 2011/0081248 A1 | 4/2011 | Hibbard |
| 2011/0091326 A1 | 4/2011 | Hancock |
| 2011/0158788 A1 | 6/2011 | Bech et al. |
| 2011/0158806 A1 | 6/2011 | Arms et al. |
| 2011/0229336 A1 | 9/2011 | Richter et al. |
| 2012/0093627 A1 | 4/2012 | Christenson et al. |
| 2012/0196079 A1 | 8/2012 | Brauers et al. |
| 2012/0213642 A1 | 8/2012 | Wang et al. |
| 2012/0269643 A1 | 10/2012 | Hibbard et al. |
| 2012/0308396 A1 | 12/2012 | Hibbard |
| 2013/0040151 A1 | 2/2013 | Jeromerajan et al. |
| 2013/0064663 A1 | 3/2013 | Loth et al. |
| 2013/0129518 A1 | 5/2013 | Hayden et al. |
| 2013/0164133 A1 | 7/2013 | Grove-Nielsen |
| 2013/0177433 A1 | 7/2013 | Fritz et al. |
| 2013/0189112 A1 | 7/2013 | Hedges et al. |
| 2013/0189114 A1 | 7/2013 | Jenzewski et al. |
| 2013/0219718 A1 | 8/2013 | Busbey et al. |
| 2013/0224032 A1 | 8/2013 | Busbey et al. |
| 2013/0236307 A1 | 9/2013 | Stege |
| 2013/0236321 A1 | 9/2013 | Olthoff |
| 2014/0286780 A1 | 9/2014 | Lemos et al. |
| 2015/0204200 A1 | 7/2015 | Eyb et al. |
| 2015/0369211 A1 | 12/2015 | Merzhaeuser |
| 2016/0032067 A1* | 2/2016 | Rowley ............ C08J 7/18 204/157.15 |
| 2016/0146185 A1* | 5/2016 | Yarbrough ........ B32B 5/22 156/242 |
| 2016/0363242 A1 | 12/2016 | De Nora |
| 2017/0275430 A1* | 9/2017 | Kube ............... C08J 3/243 |
| 2020/0094442 A1 | 3/2020 | D'Alesio |
| 2021/0388726 A1 | 12/2021 | Churcher et al. |

FOREIGN PATENT DOCUMENTS

| | | |
|---|---|---|
| CN | 108215220 A | 6/2018 |
| EP | 2186622 A1 | 5/2010 |
| EP | 3144526 A1 | 3/2017 |
| EP | 0635542 A2 | 6/2018 |
| EP | 3360670 | 8/2018 |
| FR | 2710871 A1 | 4/1995 |
| GB | 2477847 A | 8/2011 |
| WO | WO2009/034291 A2 | 3/2009 |
| WO | WO2009/077192 A2 | 6/2009 |
| WO | WO2010/023299 A2 | 3/2010 |
| WO | WO2011/064553 A2 | 6/2011 |
| WO | WO2011/066279 A2 | 6/2011 |
| WO | WO2015/051803 A1 | 4/2015 |
| WO | WO2015/185066 A1 | 12/2015 |

OTHER PUBLICATIONS

Foreign OA and CN Search Report with English translation for application No. 201880100189.8, dated Jul. 7, 2022, 27 pages.

* cited by examiner

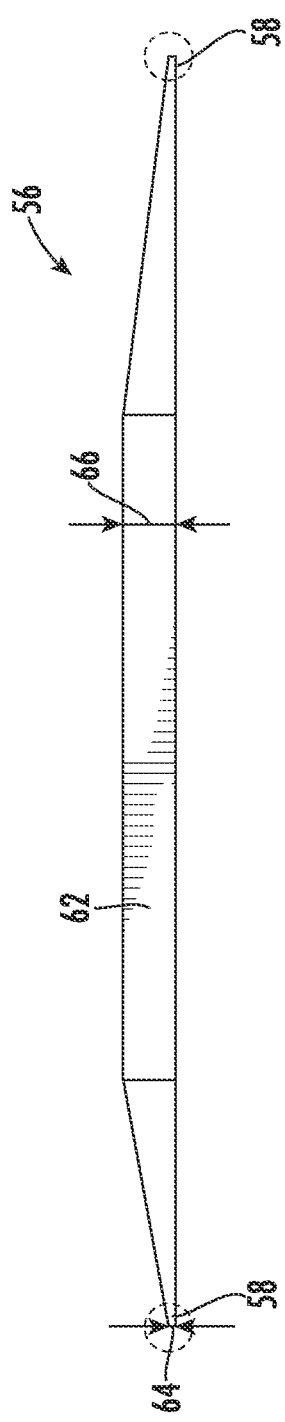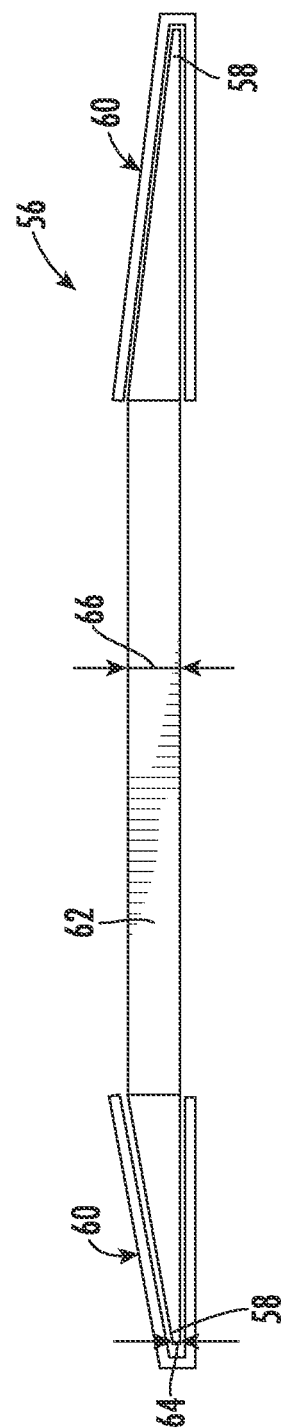

METHODS FOR MANUFACTURING BLADE COMPONENTS FOR WIND TURBINE ROTOR BLADES

FIELD

The present subject matter relates generally to rotor blades of a wind turbine and, more particularly, to methods for manufacturing blade components for wind turbine rotor blades.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and a rotor having a rotatable hub with one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The rotor blades generally include a suction side shell and a pressure side shell typically formed using molding processes that are bonded together at bond lines along the leading and trailing edges of the blade. Further, the pressure and suction shells are relatively lightweight and have structural properties (e.g., stiffness, buckling resistance and strength) which are not configured to withstand the bending moments and other loads exerted on the rotor blade during operation. Thus, to increase the stiffness, buckling resistance and strength of the rotor blade, the body shell is typically reinforced using one or more structural components (e.g. opposing spar caps with a shear web configured therebetween) that engage the inner pressure and suction side surfaces of the shell halves. Conventional spar caps and/or shear webs have been constructed of glass fiber laminate composites and/or carbon fiber laminate composites.

Certain rotor blade components may also be constructed of pultruded composites that are stronger and/or less expensive than traditional composites, as the pultruded composites can be produced in thicker sections. As used herein, the terms "pultruded composites," "pultrusions," or similar are generally defined as reinforced materials (e.g. fibers or woven or braided strands) that are impregnated with a resin and pulled through a heated stationary die such that the resin cures or undergoes polymerization. As such, the pultrusion process is typically characterized by the continuous process of composite materials that produces composite parts having a constant cross-section. Thus, a plurality of pultrusions can be infused together in a mold to form the component.

The ends of the pultruded composites, however, can create areas of local stress concentrations, thereby causing the part to delaminate. In addition, the unaltered ends may cause vacuum bag bridging issues which can lead to defects in the resulting part. Therefore, it is typical to taper the end of the pultrusion to an end thickness significantly less than the bulk formed thickness. In addition, the pultrusion also needs to be surface treated to ensure good bonding during the infusion process.

Various methods exist for surface treating pultrusions, including but not limited to the use of peel-ply, sanding, and/or the application of heat (e.g. plasma treatment). The heat method allows for the lowest cost as no additional materials are required and the speed and throughput are faster than other methods. However, heat from the treating process can result in the very thin ends of the pultrusion heating up faster than the thicker sections of the remaining portions of the pultrusion that can damage the end of the pultrusion reducing the strength in this critical area.

Accordingly, the present disclosure is directed to methods for forming pultrusions for use in manufacturing rotor blade components that addresses the aforementioned issues.

BRIEF DESCRIPTION

Aspects and advantages of the invention will be set forth in part in the following description, or may be obvious from the description, or may be learned through practice of the invention.

In one aspect, the present disclosure is directed to a method of manufacturing a blade component of rotor blade of a wind turbine. The method includes providing a plurality of pultrusions constructed of one or more fibers or fiber bundles cured together via a resin material. The method also includes placing a protective cap over at least one end of one or more of the plurality of pultrusions. Further, the method includes heat treating a surface of the plurality of pultrusions while the protective cap remains over the at least one end. Moreover, the method includes removing the protective cap from the at least one end. The method further includes arranging the plurality of pultrusions in a mold of the blade component. In addition, the method includes infusing the plurality of pultrusions together so as to form the rotor blade component.

In one embodiment, the end(s) of one or more of the plurality of pultrusions may be tapered. In such embodiments, the protective cap may be placed over the tapered end(s).

In another embodiment, heat treating the surface of the plurality of pultrusions may include plasma treating the surface of the plurality of pultrusions.

In further embodiments, the protective cap may be constructed of a metal material, such as steel. In additional embodiments, the protective cap may have a substantially V-shaped cross-section.

In certain embodiments, the blade component may correspond to a spar cap, a shear web, a root ring, or any other suitable blade component of the rotor blade. In another embodiment, the fibers or fiber bundles may include glass fibers, carbon fibers, polymer fibers, wood fibers, bamboo fibers, ceramic fibers, nanofibers, metal fibers. In further embodiments, the resin material may include a thermoset material or a thermoplastic material.

In another embodiment, the method may also include arranging the tapered pultrusions in the mold of the rotor blade component such that tapered ends of the plurality of pultrusions extend in a substantially span-wise direction when installed on the rotor blade of the wind turbine.

In another aspect, the present disclosure is directed to a method of forming a pultrusion for use in manufacturing a blade component of rotor blade of a wind turbine. The method includes forming the pultrusion of one or more fibers or fiber bundles cured together via a resin material. The method also includes placing a protective cap over at least one end of the pultrusion. Further, the method includes heat treating a surface of the pultrusion while the protective cap remains over the at least one end. In addition, the method includes removing the protective cap from the at least one end. It should be understood that the method may further include any of the additional steps and/or features as described herein.

In yet another aspect, the present disclosure is directed to a method of controlling a plasma heat treating process for forming a pultrusion for use in manufacturing a blade component of rotor blade of a wind turbine. The method includes providing the pultrusion of one or more fibers or fiber bundles cured together via a resin material. The method also includes applying a plasma treating process to at least one surface of the pultrusion while simultaneously blocking and/or reducing heat to at least one end of the pultrusion during the plasma treating process, e.g. by reducing the heat input via one or more equipment controls. The end(s) of the pultrusion defines a cross-sectional thickness that is less than an overall cross-sectional thickness of the pultrusion. It should be understood that the method may further include any of the additional steps and/or features as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 6 illustrates span-wise side view of one embodiment of a pultrusion that can be used to form a blade component of rotor blade of a wind turbine according to the present disclosure;

FIG. 7 illustrates span-wise side view of one embodiment of a pultrusion that can be used to form a blade component of rotor blade of a wind turbine according to the present disclosure, particularly illustrating protective caps at respective tapered ends of the pultrusion.

DETAILED DESCRIPTION

Figure 1:
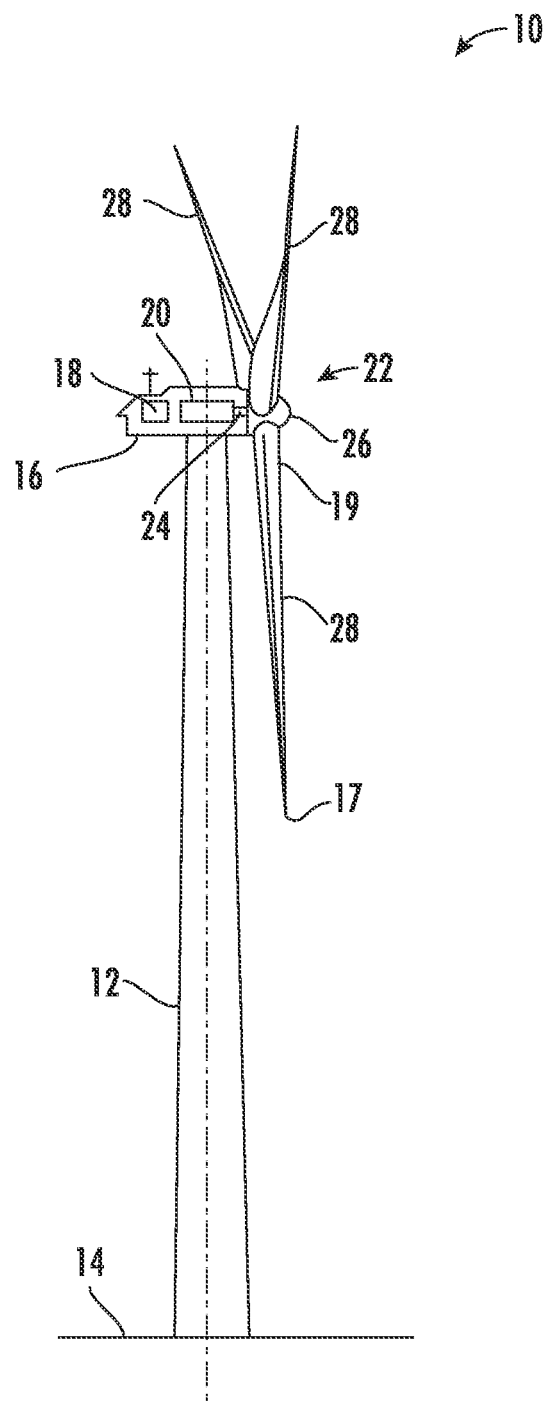
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the drawings, FIG. 1 illustrates a perspective view of one embodiment of a wind turbine 10 according to the present invention. In the illustrated embodiment, the wind turbine 10 is a horizontal-axis wind turbine. Alternatively, the wind turbine 10 may be a vertical-axis wind turbine. In addition, as shown, the wind turbine 10 may include a tower 12 that extends from a support surface 14, a nacelle 16 mounted on the tower 12, a generator 18 positioned within the nacelle 16, a gearbox 20 coupled to the generator 18, and a rotor 22 that is rotationally coupled to the gearbox 20 with a rotor shaft 24. Further, as shown, the rotor 22 includes a rotatable hub 26 and at least one rotor blade 28 coupled to and extending outward from the rotatable hub 26.

Figure 2:
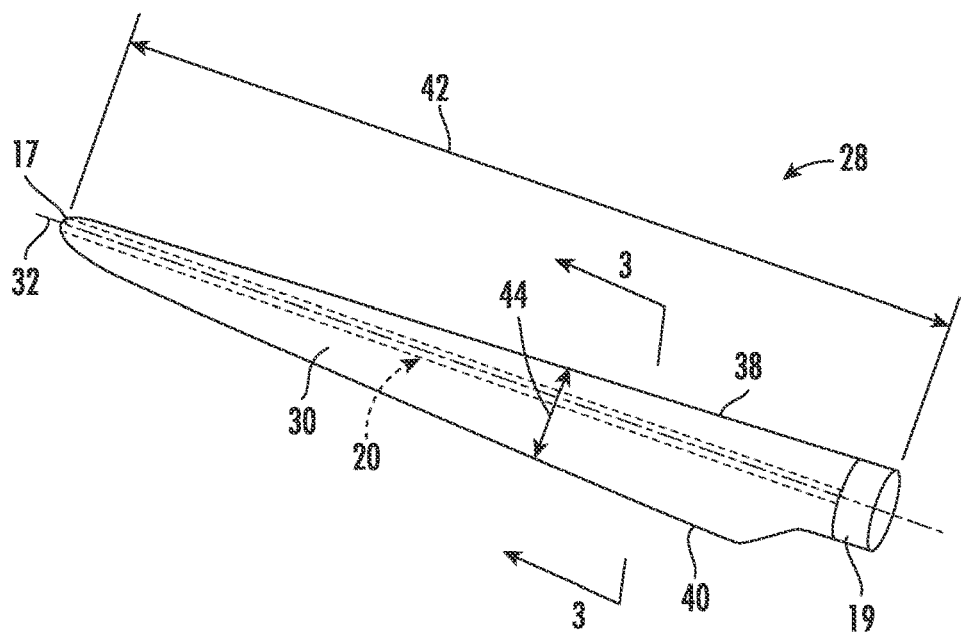
FIG. 2 illustrates a perspective view of one of the rotor blades of FIG. 1.
Figure 3:
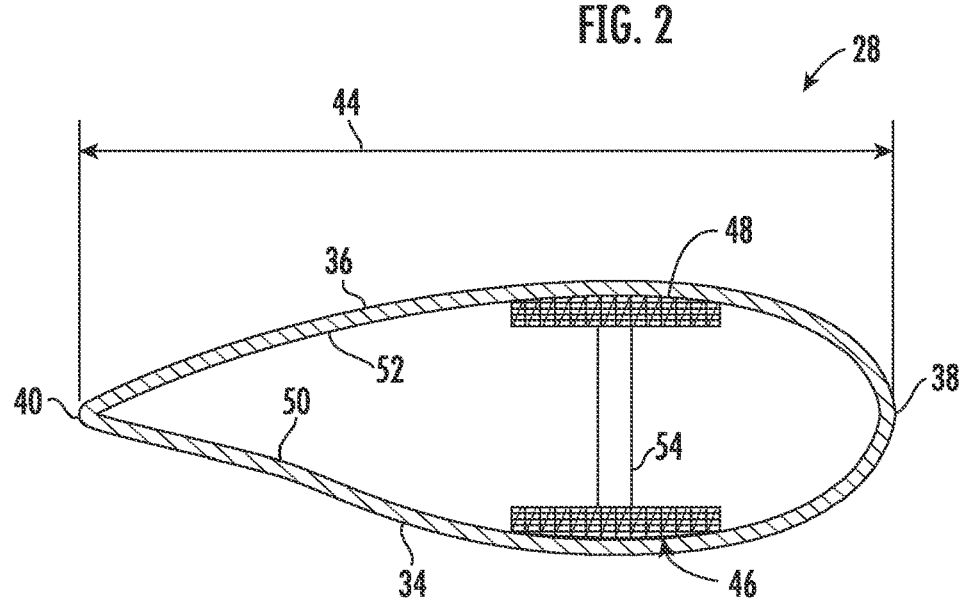
FIG. 3 illustrates a cross-sectional view of the rotor blade of FIG. 2 along line 3-3.

Referring to FIGS. 2 and 3, one of the rotor blades 28 of FIG. 1 is illustrated in accordance with aspects of the present disclosure. In particular, FIG. 2 illustrates a perspective view of the rotor blade 28, whereas FIG. 3 illustrates a cross-sectional view of the rotor blade 28 along the sectional line 3-3 shown in FIG. 2. As shown, the rotor blade 28 generally includes a blade root 19 configured to be mounted or otherwise secured to the hub 26 (FIG. 1) of the wind turbine 10 and a blade tip 17 disposed opposite the blade root 19. A body shell 30 of the rotor blade 28 generally extends between the blade root 19 and the blade tip 17 along a longitudinal axis 32. The body shell 30 may generally serve as the outer casing/covering of the rotor blade 28 and may define a substantially aerodynamic profile, such as by defining a symmetrical or cambered airfoil-shaped cross-section. As shown particularly in FIG. 3, the body shell 30 may also define a pressure side 34 and a suction side 36 extending between leading and trailing edges 38, 40 of the rotor blade 28. Further, the rotor blade 28 may also have a span 42 defining the total length between the blade root 19 and the blade tip 17 and a chord 44 defining the total length between the leading edge 38 and the trialing edge 40. As is generally understood, the chord 44 may vary in length with respect to the span 42 as the rotor blade 28 extends from the blade root 19 to the blade tip 17.

In several embodiments, the body shell 30 of the rotor blade 28 may be formed as a single, unitary component. Alternatively, the body shell 30 may be formed from a plurality of shell components. For example, the body shell 30 may be manufactured from a first shell half generally defining the pressure side 34 of the rotor blade 28 and a second shell half generally defining the suction side 36 of the rotor blade 28, with such shell halves being secured to one another at the leading and trailing ends 38, 40 of the blade 28. Additionally, the body shell 30 may generally be formed from any suitable material. For instance, in one embodiment, the body shell 30 may be formed entirely from a laminate composite material, such as a carbon fiber reinforced laminate composite or a glass fiber reinforced laminate composite. Alternatively, one or more portions of the body shell 30 may be configured as a layered construction and may include a core material, formed from a lightweight material such as wood (e.g., balsa), foam (e.g., extruded polystyrene foam) or a combination of such materials, disposed between layers of laminate composite material.

Referring particularly to FIG. 3, the rotor blade 28 may also include one or more longitudinally extending structural components configured to provide increased stiffness, buckling resistance, and/or strength to the rotor blade 28. For example, as shown, the rotor blade 28 may include a pair of longitudinally extending spar caps 46, 48 configured to be engaged against the opposing inner surfaces 50, 52 of the pressure and suction sides 34, 36 of the rotor blade 28, respectively. Additionally, one or more shear webs 54 may be disposed between the spar caps 46, 48 so as to form a beam-like configuration. The spar caps 46, 48 may generally be designed to control the bending stresses and/or other loads acting on the rotor blade 28 in a generally span-wise direction (a direction parallel to the span 42 of the rotor blade 28) during operation of a wind turbine 10. Similarly, the spar caps 46, 48 may also be designed to withstand the span-wise compression occurring during operation of the wind turbine 10.

Figure 4:
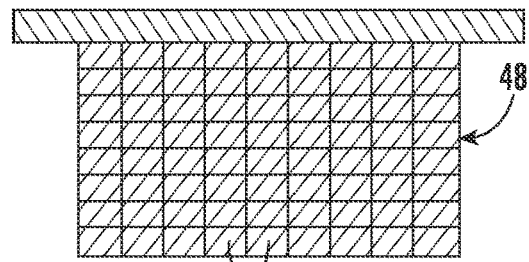
FIG. 4 illustrates a detailed, cross-sectional view of a portion of the rotor blade of FIG. 3, particularly illustrating a spar cap of the rotor blade formed from a plurality of pultrusions.

Referring now to FIG. 4, a detailed, cross-sectional view of one embodiment of one of the spar caps 48 according to the present disclosure is illustrated. As shown, the spar cap 48 is constructed of a plurality of pultrusions 56 arranged into a plurality of layers. It should be further understood that the spar caps 46, 48, as well as any of the other various blade components described in FIGS. 1-4 may be constructed using one or more pultrusions 56.

Figure 5:
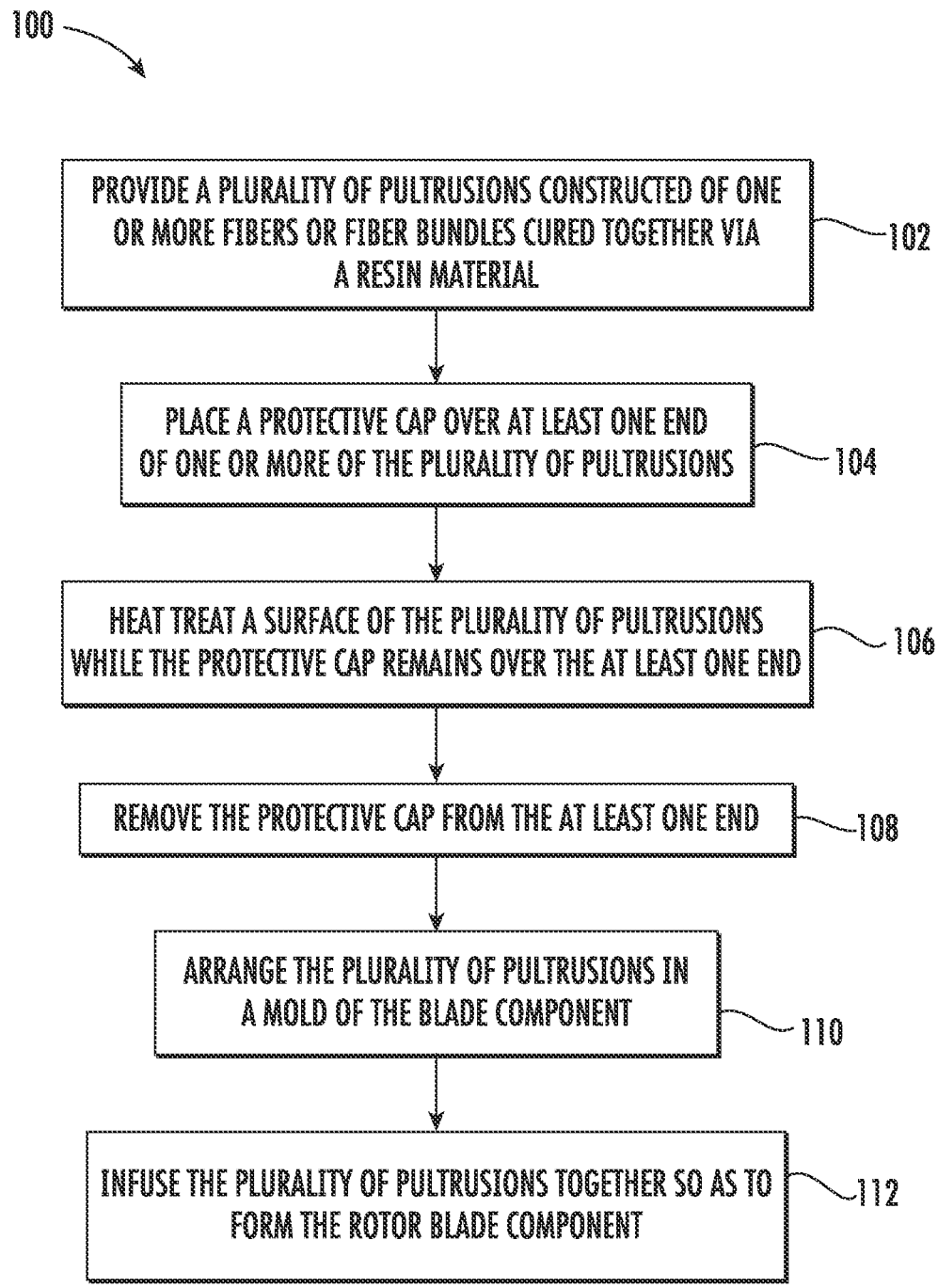
FIG. 5 illustrates a flow diagram of a method of manufacturing a blade component of rotor blade of a wind turbine according to the present disclosure.

Thus, as shown in FIG. 5, a flow chart 100 of a method of manufacturing a blade component of rotor blade of a wind turbine according to the present disclosure is illustrated. In general, the method 100 will be described herein with reference to the wind turbine 10 and the rotor blade 28 shown in FIGS. 1-4. Thus, in certain embodiments, the blade component may correspond to the spar caps 46, 48, the shear web 54, a root ring, or any other suitable blade component of the rotor blade. In addition, it should be appreciated that the disclosed method 100 may be implemented with rotor blades having any other suitable configurations. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (102), the method 100 may include providing a plurality of the pultrusions 56 constructed of one or more fibers or fiber bundles cured together via a resin material. For example, as shown in FIG. 6, a span-wise cross-sectional view of one embodiment of one of the pultrusions 56 according to the present disclosure is illustrated. As shown, end(s) 58 of the pultrusion 56 may be tapered, i.e. to minimize the effect of stiffness changes at the end of the ply. In certain embodiments, the end(s) 58 of the pultrusions 56 may be chamfered or tapered to a certain angle to achieve certain properties. For example, the tapered the end(s) 58 may have an angle of between about 15 degrees to about 35 degrees, more specifically about 20 degrees, so as to reduce the stress concentration effect at the ply ends and/or to prevent delamination between the layers. In still further embodiments, the tapered the end(s) 58 may have an angle of less than 15 degrees or greater than 35 degrees. Further, in certain embodiments, the tapered angles of the end(s) 58 of the pultrusions 56 may be equal. Alternatively, the tapered angles of the end(s) 58 may be unequal. More specifically, in further embodiments, the angle of the taper may vary as a function of the thickness of the pultrusion 56.

Thus, referring back to FIG. 5, as shown at (104), the method 100 may include placing a protective cap 60 over at least one end 58 of one or more of the plurality of pultrusions 56. For example, as shown in FIG. 7, a protective cap 60 may be placed over each of the tapered ends 58. More specifically, as shown in the illustrated embodiment, the protective cap 60 may have a substantially V-shaped cross-section. In addition, the protective cap 60 may be constructed of a metal material, such as steel.

Accordingly, referring back to FIG. 5, as shown at (106), the method 100 may include heat treating a surface 62 of the plurality of pultrusions 56 while the protective cap(s) 60 remains over the end(s) 58. For example, in one embodiment, the heat treating process may include a plasma heat treating process. As shown at (108), the method 100 may include removing the protective cap(s) 60 from the end(s) 58 after the heat treating process is complete. As shown at (110), the method 100 may include arranging the plurality of pultrusions 56 in a mold of the blade component. For example, in one embodiment, the method 100 may also include arranging the tapered pultrusions 56 in the mold of the rotor blade component such that tapered ends 58 of the plurality of pultrusions 56 extend in a substantially span-wise direction when installed on the rotor blade 28 of the wind turbine 10. After the pultrusions 56 are arranged in the mold, as shown at (112), the method 100 may include infusing the plurality of pultrusions 56 together so as to form the rotor blade component.

The thermoplastic materials described herein may generally encompass a plastic material or polymer that is reversible in nature. For example, thermoplastic materials typically become pliable or moldable when heated to a certain temperature and returns to a more rigid state upon cooling. Further, thermoplastic materials may include amorphous thermoplastic materials and/or semi-crystalline thermoplastic materials. For example, some amorphous thermoplastic materials may generally include, but are not limited to, styrenes, vinyls, cellulosics, polyesters, acrylics, polysulphones, and/or imides. More specifically, exemplary amorphous thermoplastic materials may include polystyrene, acrylonitrile butadiene styrene (ABS), polymethyl methacrylate (PMMA), glycolised polyethylene terephthalate (PET-G), polycarbonate, polyvinyl acetate, amorphous polyamide, polyvinyl chlorides (PVC), polyvinylidene chloride, polyurethane, or any other suitable amorphous thermoplastic material. In addition, exemplary semi-crystalline thermoplastic materials may generally include, but are not limited to polyolefins, polyamides, fluropolymer, ethyl-methyl acrylate, polyesters, polycarbonates, and/or acetals. More specifically, exemplary semi-crystalline thermoplastic materials may include polybutylene terephthalate (PBT), polyethylene terephthalate (PET), polypropylene, polyphenyl sulfide, polyethylene, polyamide (nylon), polyetherketone, or any other suitable semi-crystalline thermoplastic material.

Further, the thermoset materials as described herein may generally encompass a plastic material or polymer that is non-reversible in nature. For example, thermoset materials, once cured, cannot be easily remolded or returned to a liquid state. As such, after initial forming, thermoset materials are generally resistant to heat, corrosion, and/or creep. Example thermoset materials may generally include, but are not limited to, some polyesters, some polyurethanes, esters, epoxies, or any other suitable thermoset material.

In addition, the resin material described herein may be optionally reinforced with one or more fiber materials, including but not limited to glass fibers, carbon fibers, polymer fibers, wood fibers, bamboo fibers, ceramic fibers, nanofibers, metal fibers, or combinations thereof. In addition, the direction or orientation of the fibers may include quasi-isotropic, multi-axial, unidirectional, biaxial, triaxial, or any other another suitable direction and/or combinations thereof.

Figure 8:
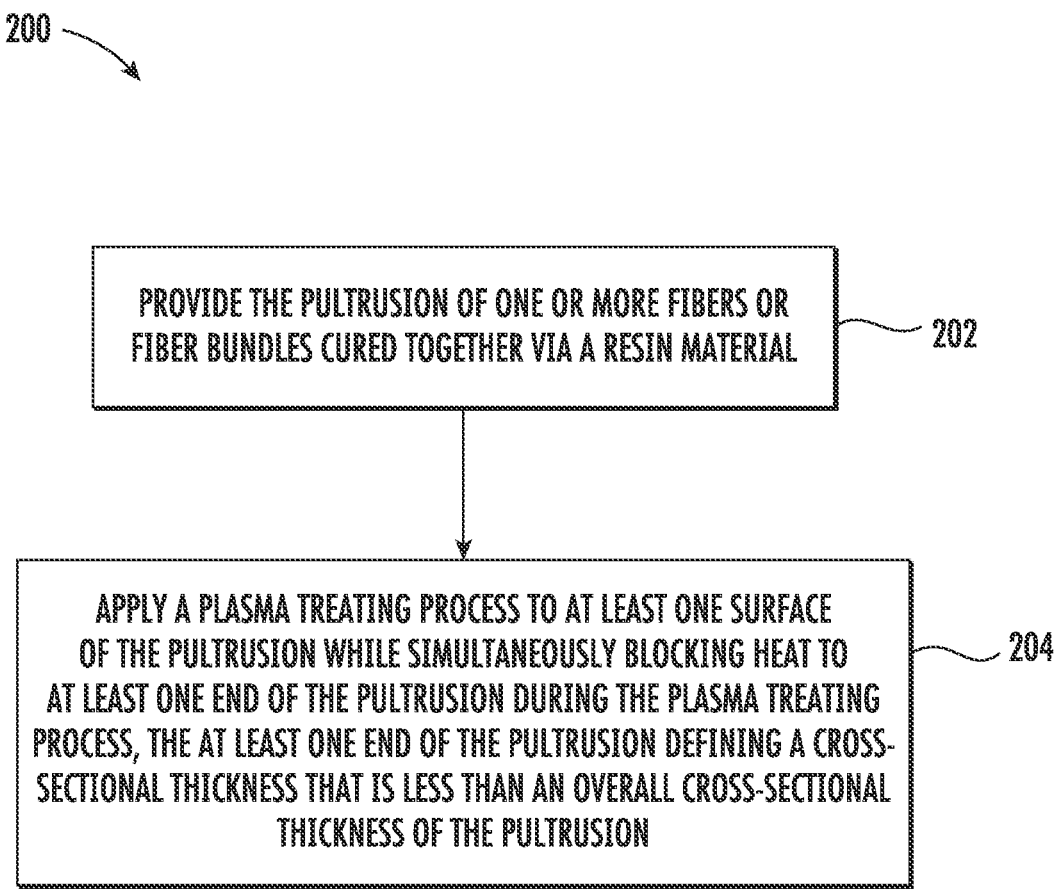
FIG. 8 illustrates a flow diagram of a method of controlling a plasma heat treating process for forming a pultrusion for use in manufacturing a blade component of rotor blade of a wind turbine according to the present disclosure.

Referring now to FIG. 8, a flow chart 200 of a method of controlling a plasma heat treating process for forming a pultrusion for use in manufacturing a blade component of rotor blade of a wind turbine according to the present disclosure is illustrated. In general, the method 200 will be described herein with reference to the wind turbine 10 and the rotor blade 28 shown in FIGS. 1-4. Thus, in certain embodiments, the blade component may correspond to the spar caps 46, 48, the shear web 54, a root ring, or any other suitable blade component of the rotor blade. In addition, it should be appreciated that the disclosed method 100 may be implemented with rotor blades having any other suitable configurations. In addition, although FIG. 8 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (202), the method 200 may include providing the pultrusion 56 of one or more fibers or fiber bundles cured together via a resin material. As shown at (204), the method 200 may include applying a plasma treating process to at least one surface of the pultrusion 56 while simultaneously blocking heat to at least one end of the pultrusion 56 during the plasma treating process. Referring back to FIGS. 6 and 7, the end(s) 58 of the pultrusion 56 defines a cross-sectional thickness 64 that is less than an overall cross-sectional thickness 66 of the pultrusion 56.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of manufacturing a blade component of rotor blade of a wind turbine, the method comprising:
   providing a plurality of pultrusions constructed of one or more fibers or fiber bundles cured together via a resin material;
   placing a protective cap over at least one end of one or more of the plurality of pultrusions, the protective cap conforming to a shape of the at least one end;
   heat treating a surface of the plurality of pultrusions while the protective cap remains over the at least one end;
   removing the protective cap from the at least one end;
   arranging the plurality of pultrusions in a mold of the blade component; and,
   infusing the plurality of pultrusions together so as to form the rotor blade component.

2. The method of claim 1, wherein the at least one end of one or more of the plurality of pultrusions is tapered, the protective cap being placed over the at least one tapered end.

3. The method of claim 1, wherein heat treating the surface of the plurality of pultrusions further comprises plasma treating the surface of the plurality of pultrusions.

4. The method of claim 1, wherein the protective cap is constructed of a metal material.

5. The method of claim 1, wherein the protective cap is placed over each end of the one or more plurality of pultrusions.

6. The method of claim 1, wherein the protective cap comprises a substantially V-shaped cross-section.

7. The method of claim 1, wherein the blade component comprises at least one of a spar cap, a shear web, or a root ring.

8. The method of claim 1, wherein the fibers or fiber bundles comprise at least one of glass fibers, carbon fibers, polymer fibers, wood fibers, bamboo fibers, ceramic fibers, nanofibers, metal fibers.

9. The method of claim 1, wherein the at least one resin material further comprises at least one of a thermoset material or a thermoplastic material.

10. The method of claim 1, further comprising arranging the tapered pultrusions in the mold of the rotor blade component such that tapered ends of the plurality of pultrusions extend in a substantially span-wise direction when installed on the rotor blade of the wind turbine.

11. The method of claim 10, wherein the at least one resin material further comprises at least one of a thermoset material or a thermoplastic material.

12. The method of claim 1, wherein the protective cap is placed over each end of the one or more plurality of pultrusions.

13. A method of forming a pultrusion for use in manufacturing a blade component of rotor blade of a wind turbine, the method comprising:
   forming the pultrusion of one or more fibers or fiber bundles cured together via a resin material;
   placing a protective cap over at least one end of the pultrusion, the protective cap conforming to a shape of the at least one end;
   heat treating a surface of the pultrusion while the protective cap remains over the at least one end; and,
   removing the protective cap from the at least one end.

14. The method of claim 13, further comprising tapering the at least one end of pultrusion and placing the protective cap over the at least one tapered end.

15. The method of claim 13, wherein heat treating the surface of the plurality of pultrusions further comprises plasma treating the surface of the plurality of pultrusions.

16. The method of claim 13, wherein the blade component comprises at least one of a spar cap, a shear web, or a root ring.

17. The method of claim 13, wherein the protective cap is constructed of a metal material.

18. The method of claim 13, wherein the protective cap comprises a substantially V-shaped cross-section.

19. The method of claim 13, wherein the fibers or fiber bundles comprise at least one of glass fibers, carbon fibers, polymer fibers, wood fibers, bamboo fibers, ceramic fibers, nanofibers, metal fibers.

20. A method of controlling a plasma heat treating process for forming a pultrusion for use in manufacturing a blade component of rotor blade of a wind turbine, the method comprising:
   providing the pultrusion of one or more fibers or fiber bundles cured together via a resin material;

placing a protective cap over at least one end of the pultrusion, the protective cap conforming to a shape of the at least one end; and, applying a plasma treating process to at least one surface of the pultrusion while simultaneously blocking heat to the at least one end of the pultrusion with the protective cap during the plasma treating process, the at least one end of the pultrusion defining a cross-sectional thickness that is less than an overall cross-sectional thickness of the pultrusion.

* * * * *